United States Patent
Powell et al.

(10) Patent No.: US 8,661,503 B2
(45) Date of Patent: Feb. 25, 2014

(54) FLEXIBLE DOCUMENT SECURITY FOR PROCUREMENT AGENTS

(75) Inventors: Kim E. Powell, Niwot, CO (US); Suman Guha, Fremont, CA (US); David S. Merrill, Palo Alto, CA (US); Sanjay S. Thakur, San Ramon, CA (US); Keng Lap Ao, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 13 days.

(21) Appl. No.: 13/251,066

(22) Filed: Sep. 30, 2011

(65) Prior Publication Data

US 2013/0086624 A1    Apr. 4, 2013

(51) Int. Cl.
*H04L 29/06* (2006.01)
*G06F 21/00* (2013.01)

(52) U.S. Cl.
USPC ............................................... 726/1; 726/27

(58) Field of Classification Search
None
See application file for complete search history.

(56) References Cited

U.S. PATENT DOCUMENTS

| | | | |
|---|---|---|---|
| 2004/0015367 A1* | 1/2004 | Nicastro et al. | 705/1 |
| 2004/0019799 A1* | 1/2004 | Vering et al. | 713/200 |
| 2009/0158384 A1* | 6/2009 | Kanade et al. | 726/1 |
| 2010/0299268 A1 | 11/2010 | Guha et al. | |

OTHER PUBLICATIONS

"Oracle Purchasing User's Guide," Release 12, Part No. B28669-01, Dec. 2006 (1140 pages).
"PeopleSoft Enterprise eProcurement: Strategic Procurement for Education and Government," Oracle Peoplesoft Enterprise, Sep. 2002 (11 pages).

* cited by examiner

*Primary Examiner* — Gilberto Barron, Jr.
*Assistant Examiner* — Malcolm Cribbs
(74) *Attorney, Agent, or Firm* — Vista IP Law Group, LLP

(57) ABSTRACT

A method, system, and computer program product for providing document security for procurement agents. The method commences by establishing user authentication credentials for at least two procurement agents. Then, initially granting limited access to a first set of documents where the first set of documents is initially under control of the first procurement agent (and initially inaccessible by the second procurement agent), and initially granting limited access to a second set of documents, where the second set of documents is initially under control of the second procurement agent. A procurement application receives an access request from the first user to access a document from among the second set of documents, causing the procurement application to confirm the first user authentication credentials, retrieve the document access rule for the first procurement agent, and allow/deny access by the first user to the document from among the second set of documents.

20 Claims, 16 Drawing Sheets

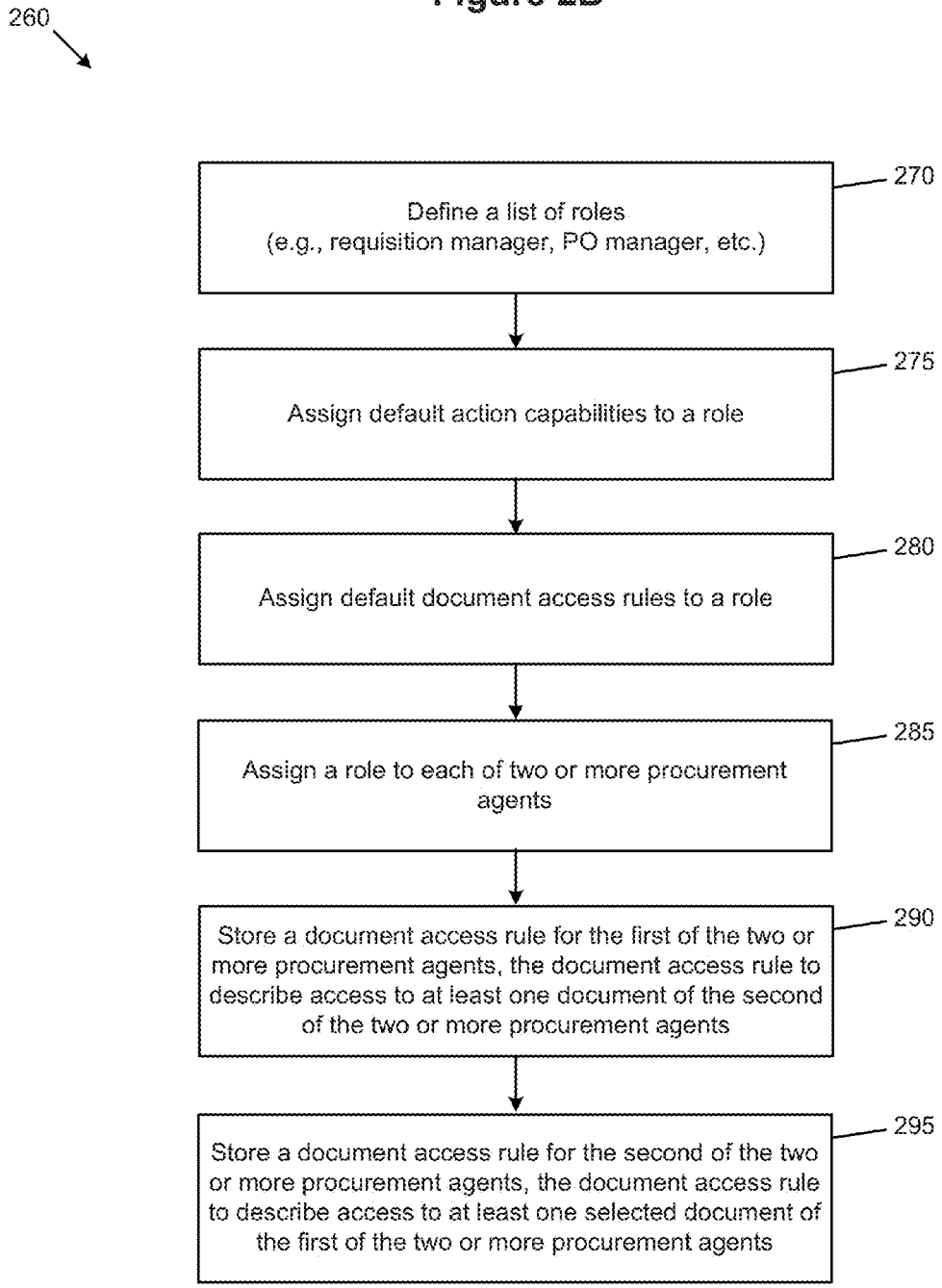

… (1 / 2) …

FLEXIBLE DOCUMENT SECURITY FOR PROCUREMENT AGENTS

FIELD

The disclosure relates to the field of data management in an electronic exchange and more particularly to document security for procurement agents acting in the exchange.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

A procurement agent is a user (e.g., a real person or a computer-implemented surrogate) serving to manage processes between a buying and selling organization. As used in this paragraph, a procurement agent acts on behalf of a buying organization, for example, to procure goods or services from a supplier; or, a procurement agent acts on behalf of a selling organization. Typically, the procurement agents' duties include identifying savings opportunities, determining negotiation strategies, creating sourcing events, awarding future business (e.g., in the form of contracts or purchase orders to suppliers), administering procurement contracts, evaluating and qualifying of the supply base, administering catalog content, and managing the transactional aspects of the procurement process. Sample job titles that a procurement agent may have within an organization include "Buyer", "Procurement Manager", "Category Manager", "Procurement Contracts Administrator", "Supplier Administrator", and "Catalog Administrator". Regardless of any assigned title, a procurement agent may take on a role (or sometimes multiple roles) to perform any one or more of the aforementioned services within an enterprise and, in the fulfillment of such a role, a procurement agent typically uses one or more procurement applications in the performance of such services.

Most procurement applications are delivered as one or more software modules running on commodity (or custom) hardware computing platforms, and most have a mechanism to define duties (e.g., process purchase orders, negotiate contracts, etc.) and/or roles (e.g., a role of buyer, seller, administrator, agent). In some cases a procurement application can be configured to provide access to documents used for communication within the enterprise and between buyers and sellers. Sometimes access to a document is shared within the enterprise and between buyers and sellers using an electronic exchange. And, in some cases, a procurement application can be configured to provide shared access to documents based on coarse definitions of document access (e.g., corresponding to a hierarchy). In some situations, coarse definitions of document access can suffice, however as the complexity of interactions within and between enterprises grows, so does the complexity of managing shared access.

Legacy procurement applications lack the ability to define a robust and flexible list of roles and duties that addresses the complexity of the interactions within and between the aforementioned enterprises.

Such deficiencies are often exacerbated in the sense that modern enterprises have a hierarchical reporting structure that includes 'junior agents' whose work is performed at the direction of more senior agents. Thus, it is possible that the more senior agents may have a need to access (e.g., to view, to edit, etc.) the documents of a junior agent. In such a scenario it is reasonable to give full access to the more senior agent for accessing the junior agent's documents, while concurrently restricting accesses to the junior agent's documents by other junior agents. However, legacy implementations fail to provide techniques to define and enforce permissible actions that an agent (e.g., a particular junior agent, or a more senior agent) can perform on documents.

As used herein, procurement refers to the acquisition of goods and/or services for the benefit of or use by entities (e.g., business units) in an enterprise. Procurement requisitions (e.g., requests to purchase raw materials, office supplies, capital equipment, etc.) are typically generated by many business units in an enterprise. While it is advantageous to establish multiple (e.g., primary and backup) procurement service providers (e.g., procurement agents) in an enterprise, each of whom are specifically adapted to perform some or all of these procurement activities on behalf of procurement clients, not all procurement agents have a need-to-know for all information regarding another procurement agent's activities. And in fact, some certain set of a procurement agent's documents (e.g., documents underlying the activities) should be restricted from access by other procurement agents.

What is needed are techniques to address the deficiencies of the legacy solutions and, more specifically, to address document security deficiencies by providing techniques to define and enforce permissible actions that an agent can perform to a document.

SUMMARY

Embodiments of the disclosed procurement systems solve specific document access problems by allowing flexible and selective configuration (and enforcement) of rights, privileges, and access to documents between procurement agents (e.g., users being real people or a computer-implemented agents). A module within a procurement system commences by establishing user authentication credentials for at least two procurement agents (e.g., a junior procurement agent, and a more senior procurement agent). Then, initially granting limited access to a first set of documents where the first set of documents is initially under control of the first procurement agent (and initially inaccessible by the second procurement agent), and initially granting limited access to a second set of documents, where the second set of documents is initially under control of the second procurement agent. A procurement application receives an access request from the first user to access a document from among the second set of documents, causing the procurement application to confirm the first user authentication credentials, retrieve the document access rule for the first procurement agent, and allow (or deny) access by the first user to the document from among the second set of documents.

In some cases the aforementioned first procurement agent might be a junior procurement agent, and the aforementioned second procurement agent might be a more senior procurement agent, and thus such a possible manager/subordinate organizational structure is supported by the techniques disclosed herein.

Further details of aspects, objects and advantages of the disclosure are described below in the detailed description, drawings and claims. Both the foregoing general description of the background and the following detailed description are exemplary and explanatory and are not intended to be limiting as to the scope of the claims.

BRIEF DESCRIPTION OF THE DRAWINGS

FIG. 2B illustrates a block diagram of a configuration flow for storing a document access rule, according to some embodiments.

DETAILED DESCRIPTION

Figure 1A:
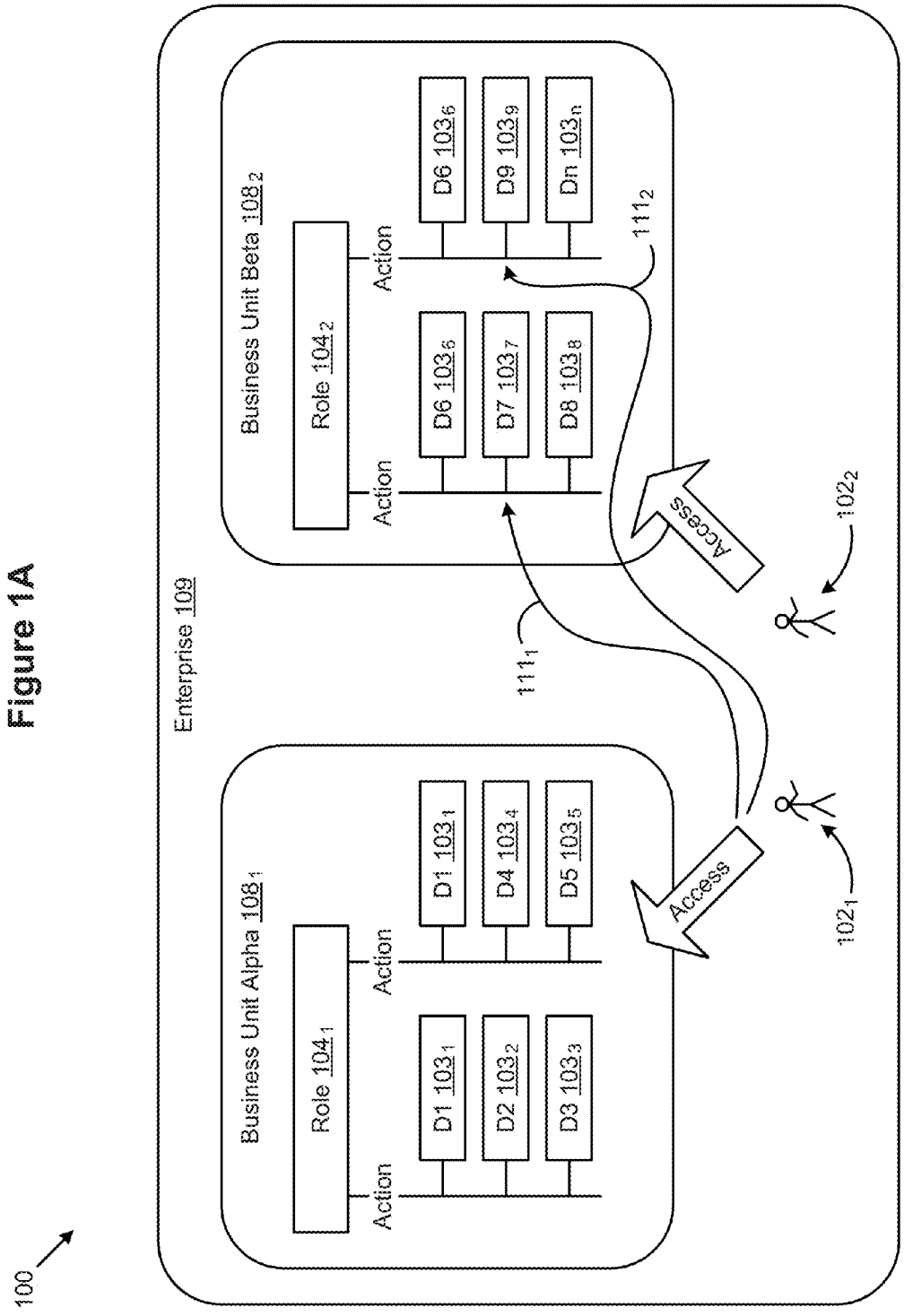
FIG. 1A illustrates an environment for implementing flexible document security for procurement agents, according to some embodiments.

Embodiments of the present disclosure are directed to an improved approach for implementing flexible document security for procurement agents.
Introduction Modern enterprises need an improved approach for implementing flexible document security for procurement agents. Techniques are provided herein to create a procurement agent definition record (a record in a database) for a procurement agent (e.g., a real person or a computer-implemented agent) within an enterprise. Such a procurement agent performs actions for managing processes between a buying organization and a selling organization. The procurement agent definition record details the duties that a procurement agent can perform, including duties that a procurement agent can perform within, and/or across different procurement organizations. Moreover, the procurement agent definition record details if and/or when one agent can access another agents documents and what actions a procurement agent can perform while accessing another procurement agent's documents. For example, a procurement agent definition record defines specific management processes, duties, association with a particular procurement organization, etc., and can also indicate specifically permitted and/or specifically denied actions. Except as detailed in the descriptions herein, a procurement agent is always allowed to perform all actions on or with their own documents so long as the procurement agent has proper and verifiable credentials.

When defining an agent (e.g., creating a procurement agent definition record) the definition identifies the procurement organization specifically (e.g., the name of a division or department in an enterprise) and the definition identifies the procurement agent's actions. Examples of such actions include: managing requisitions, managing orders, managing agreements, managing negotiations, managing suppliers, managing approved supplier entries, managing catalog content, and analyzing spend. In addition, a procurement agent definition record identifies a credential and/or other codification of the procurement agent's organization, assigned duties, specific actions the procurement agent is allowed to perform and specific actions the procurement agent is allowed to perform on another agent's documents. For example, such specific actions include the type of access granted for a given document (e.g., no access, view or read-only access, modify access, and/or full access).

The type of access is interpreted based on the assigned duties and actions being performed by a particular agent, and the interpretation can include application (e.g., enforcement) of specific rules for specific situations. Strictly as an example, if a procurement agent were assigned a role under which the procurement agent were responsible to manage orders and agreements, then the following interpretation might be enforced:

Access="None" is interpreted as: Cannot access another agent's purchase orders and agreements.

Access="View" is interpreted as: Can view another agent's purchase orders and agreements.

Access="Modify" is interpreted as: Can view, edit, delete, and withdraw another agent's purchase orders and agreements.

Access="Full" is interpreted as: Can view, edit, delete, withdraw, freeze, place on hold, close, cancel, and final close another agent's purchase orders and agreements.

In exemplary embodiments, disclosed systems automatically check credentials and procurement agent definitions records, and detects if a procurement agent is authorized to perform applicable actions. In some cases, such a check and detection capability is implemented within user interfaces. For example, certain features within a procurement application are enabled (shown and allowed) or disabled (grayed-out and denied).

ADDITIONAL DEFINITIONS AND EMBODIMENTS

An agent (e.g., a real person or a computer-implemented surrogate) is assigned to fulfill the roles of a "procurement agent", and the procurement agent performs actions within an enterprise for managing processes between a buying organization and a selling organization. The practice of such a flexible document security model often includes the notion of a super-user (e.g., a procurement manager, or a computer-implemented surrogate) who is provided with appropriate authentication credentials and privileges in order to make certain administrative changes to one or more application databases. The super-user serves to create a database entry, the entry assigning a procurement agent to a procurement agent definition record, which procurement agent definition record will in turn serve to refer to, and/or codify rules. The rules comprise details as to the actions that a procurement agent can perform in varying capacities. A rule can also comprise details as to the procurement agent's actions within different procurement organizations. Also, the procurement agent definition record can detail what actions a procurement agent may perform on or with another agent's document. In most situations, a procurement agent is allowed to perform all actions on their own documents.

Many enterprises (e.g., a company, a firm) are comprised of one or more business units, and each business unit can comprise a procurement organization (e.g., a department, a section, etc.). Moreover modern enterprises are often structured hierarchically, possibly including one or more hierarchies of legal entities (e.g., subsidiaries), business units, divisions, departments, and warehouses, and any of such hierarchies can comprise one or more procurement organizations. When defining a procurement agent definition record, a super-user can specify one or more procurement organizations and a super-user can specify one or more procurement agent roles. A given role can further span a range of duties, including managing requisitions, managing orders, managing agreements, managing negotiations, managing suppliers, managing approved supplier entries, managing catalog content, and analyzing spending. In addition, a super-user can specify, in the procurement agent definition record, a set of actions that the procurement agent is allowed to perform on or using other agent's documents. In particular, a super-user can specify if the agent has a particular type of access (e.g., access of type "None", access of type "View Access", access of type "Modify Access", access of type "Full Access", etc) to another agent's documents.

The aforementioned four levels of access can be defined variously. In this example, the levels are defined as follows: "View Access" refers to an ability to view another agent's purchase orders and agreements; "Modify Access" refers to an ability to view, edit, delete and withdraw other agent's purchase orders and agreements; "Full Access" refers to an ability to view, edit, delete, withdraw, freeze, place on hold, close, cancel and final close other agent's purchase orders and agreements; and "None" refers to no access to another agent's documents. The embodiments described herein include a system including computer-implemented techniques for automatically detecting if a procurement agent can perform some, all or none of the aforementioned actions. In some embodiments, specific features within a given application are enabled or disabled based on automatic detection of a procurement agent's access permissions.

Selected characteristics of the aforementioned system can include a user interface to define the procurement agent, the procurement organizations that the agent has access to, which actions the agent is allowed to perform (e.g., which actions the agent is allowed to perform on behalf of a given procurement organization), and what actions the procurement agent can perform on or with other agent's documents. Other characteristics include a programmatic function that determines the hierarchical structure (e.g., business unit, procurement organization, etc.) that a procurement agent has access to; a programmatic function to determine the roles to which a procurement agent has been assigned; a programmatic function that determines the actions that a procurement agent can perform on other agent's documents; and a user interface that enables or disables features of a particular application (e.g., based on a given procurement agent definition record).

FIG. 1A illustrates an environment 100 for implementing flexible document security for procurement agents 102. As aforementioned, the practice of such a flexible document security model covering two or more procurement agents 102 in an enterprise 109 often includes the notion of a super-user (see FIG. 1B) who is provided with appropriate authentication credentials and privileges in order to make certain administrative changes to one or more application databases. The super-user serves to create a database entry, the entry serving to assign a procurement agent to a procurement agent definition record, which procurement agent definition record will in turn serve to codify rules. The rules comprise details as to the duties that a procurement agent can perform in varying capacities, and may also comprise a role 104 with corresponding permitted actions, possibly including actions to be taken on or with a particular document 103. A rule can also comprise details as to the procurement agent's duties within different procurement organizations. That is, a particular procurement agent 102 might be assigned (e.g., by a super-user 101) to perform negotiations within one business unit 108 (e.g., business unit alpha 108$_1$) and also to perform actions as a buyer for another business unit (e.g., business unit beta 108$_2$). Also, the procurement agent definition record defines initial access characteristics to documents. For example, an initial access configuration might codify initial access for the agent to access the agent's own document space (e.g., a directory or folder) and any contents of that space (e.g., the directory or folder, and/or its hierarchical descendants). As shown, a particular procurement agent 102$_1$ is granted access to the documents 103 within business unit alpha (e.g., documents D1-D5). And, a particular procurement agent 102$_2$ is granted access to the documents 103 within business unit beta (e.g., documents D6-Dn).

Also as shown, and corresponding to the techniques disclosed herein, the procurement agent 102$_1$ is granted access to documents D7 and D9 (depicted by the segment 111$_1$ and segment 111$_2$).

The herein-disclosed techniques for flexible document security for procurement agents can be practiced in the environment of FIG. 1A, and/or in other environments, some of which environments are described below.

Figure 1B:
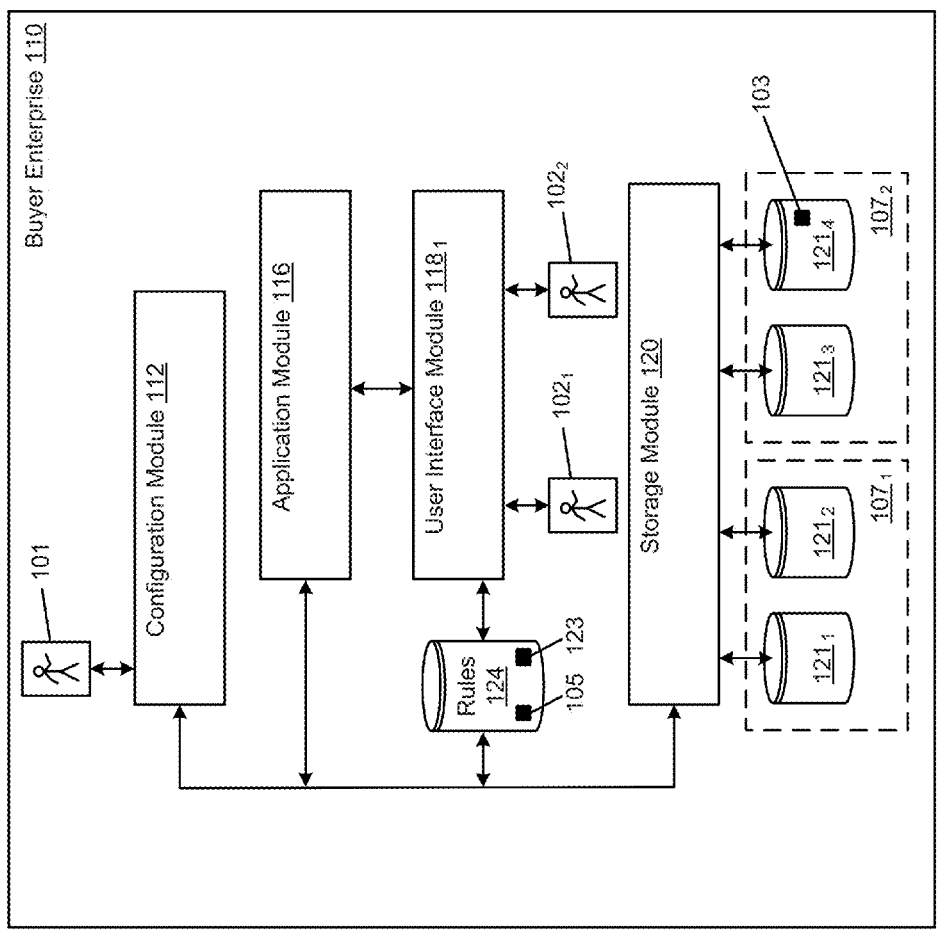
FIG. 1B illustrates an environment and system for implementing flexible document security for procurement agents, according to some embodiments.

FIG. 1B illustrates an environment 100 and system for implementing flexible document security for procurement agents. As aforementioned, the practice of such a flexible document security model covering procurement agents 102 in an enterprise 109 (e.g., a buyer enterprise 110) and such an enterprise may avail itself of one or more application modules 116 (e.g., a purchase order application, a supplier management application, etc.). Exemplary practice often includes a configuration module that can serve to configure any one or more application modules 116, and/or user interface modules 118, and/or any storage modules 120. Exemplary practice can also include operations taken by a super-user 101 to configure instances of rules 124. An authorized super-user interfaces with a configuration module 112 to codify rules. The codified rules serve to configure access to documents between two or more procurement agents. Thus, a super-user can use a configuration module 112 in order to establish user authentication credentials for two or more procurement agents. The aforementioned agents might be associated with the same or different business units (e.g., business unit alpha, business unit beta, etc.). In some cases a user credential is established (e.g., by the super-user) as a record stored in a persistent storage unit (e.g., rules 124) having a business unit association. Of course a second procurement agent may also have a business unit association (e.g., to the same or a different business unit) and the second procurement agent's user authentication credentials can so indicate. The aforementioned user credential can be established as having a particular business unit association, which association might arise due to the user being an employee or contractor assigned to the particular business unit. In this manner, a system to provide flexible document security for procurement agents can be defined. It is possible that a user authentication credential can be established on a per agent basis, or it is possible that a user authentication credential can be established based on a hierarchical organization. In such a manner, a first agent can be granted access to documents belonging to all the other agents in the hierarchical organization (e.g., business unit).

As shown, a super-user can interface with the configuration module 112, which configuration module in turn stores rules (e.g., a document access rule 105). A document access rule 105 (e.g., a default rule) can serve to initially grant limited access to a procurement agent's documents. Such procurement agent's documents are stored in a persistent storage location (e.g., storage unit 121) and are accessible via a storage module 120. In some cases, one or more storage units are physical storage units. It is also possible that a partition 107 is created for separating one set of storage units (e.g., storage unit $12_{11}$, storage unit $12_{12}$) from another set of storage units (e.g., storage unit $12_{13}$, storage unit $12_{14}$). In this scenario, it is possible that a first set of documents being initially under control of the first procurement agent is initially inaccessible by a second procurement agent. Conversely, it is possible that a second set of documents being initially under control of the second procurement agent is initially inaccessible by the first procurement agent.

However, as heretofore indicated, certain operational circumstances arise that demand more flexible document security for procurement agents, especially flexibilities such that one procurement agent can access at least some of the documents of another procurement agent.

Accordingly, the super-user might want to grant one or more forms of document access such that one procurement agent can access at least some of the documents of another procurement agent, and the super-user can interface with a configuration module 112 for storing a document access rule 105 for one procurement agent where the document access rule describes a particular type of access to at least one selected document belonging to another procurement agent.

Such a document access rule 105 can be stored in a persistent storage device, and the document access rule 105 can be enforced by one or more software modules (e.g., any one or more procurement applications). Further, a procurement application can be configured to provide access, and/or deny access, and/or establish access rules pertaining to actions and documents used for communication within the enterprise and between buyers and sellers. For example, a storage module 120 can be configured to receive an access request from a user, then to confirm the user's instances of any authentication credentials 123, and then to retrieve any one or more document access rules for the authenticated user. Once the user authentication credential 123 has been verified, then the storage module 120 can selectively allow access by the requesting user to access the document(s) from among the second set of documents. Such would be the case when the retrieved document access rule covers the access request.

However, it is possible that a retrieved document access rule indicates that access should be denied and, in such a case, the storage module 120 can selectively deny access by the requesting user to the document(s) when the retrieved document access rule does not cover the access request. It is also possible that a user authentication credential itself codifies a rule to selectively deny access by the requesting user to certain document(s).

Of course, the steps for enforcing the document access rule can be implemented by any procurement application, of which the storage module 120 is but one example. Other applications that can serve to enforce document access rules include the application module 116, and the user interface module 118, either singly or in combination. Also, the configuration module 112 can serve to enforce document access rules.

Returning to the discussion of FIG. 1A, documents (e.g., document D1, document D2, etc.) can be associated with a particular procurement action or activity. For example, document D1 might be a purchase order, and would be accessed by the procurement agent assigned to handle the role 104 of processing purchase orders (e.g., to take an action to approve a purchase order). In exemplary cases, one or more specific actions (e.g., a purchase order approval) can be associated with a role (e.g., a purchase order processor), and rules addressing the permission for a procurement agent in that role can be codified so as to permit a particular procurement agent to perform such specific actions or deny a particular procurement agent from performing such specific actions.

In some environments, an enterprise, or constituent business unit can employ multiple procurement agents, each having varying experience, skill sets, capabilities and authorizations. In such a situation it is desirable to assign one or more first permitted actions to a first procurement agent, and to assign one or more second permitted actions to a second procurement agent. Such an assignment can facilitate workload balancing, and can facilitate accountability between multiple procurement agents working in the same enterprise (or even in the same business unit).

As can now be understood, the aforementioned default rule can serve to initially grant limited access to a document or procurement document type (see exemplary list, below) based on the assigned role. Moreover such a default rule (or any document access rule) can include one or more particular types of access; for example, an access type identifier can serve to implement a document access rule for actions such as (a) read access, (b) modify access, (c) full access, and/or even (d) no access. Such document access actions (e.g., via a document access type identifier) can be applied to any sort of procurement document type including, but not limited to, (a) a requisition document, (b) an order document, (c) a procurement agreement document, (d) a negotiation document, (e) an approved supplier list document, (f) a catalog document, (g) a management information document, etc.

Thus, embodiments can define the duties, roles and actions that a procurement agent can perform, as well as define what specific documents correspond to a particular action. Still more, the embodiments described herein can define the duties, roles and actions that a procurement agent can perform on behalf of another procurement agent, including permitting (or denying) specific actions and permitting (or denying) specific types of access to another agent's documents.

It is possible that a procurement agent can be authorized (e.g., via a rule) to perform actions on behalf of another procurement agent, with or without any particular document access rule. That is, while a document is often associated with an action, it is possible that an action need not be specific to a particular document or document type.

Figure 1C:
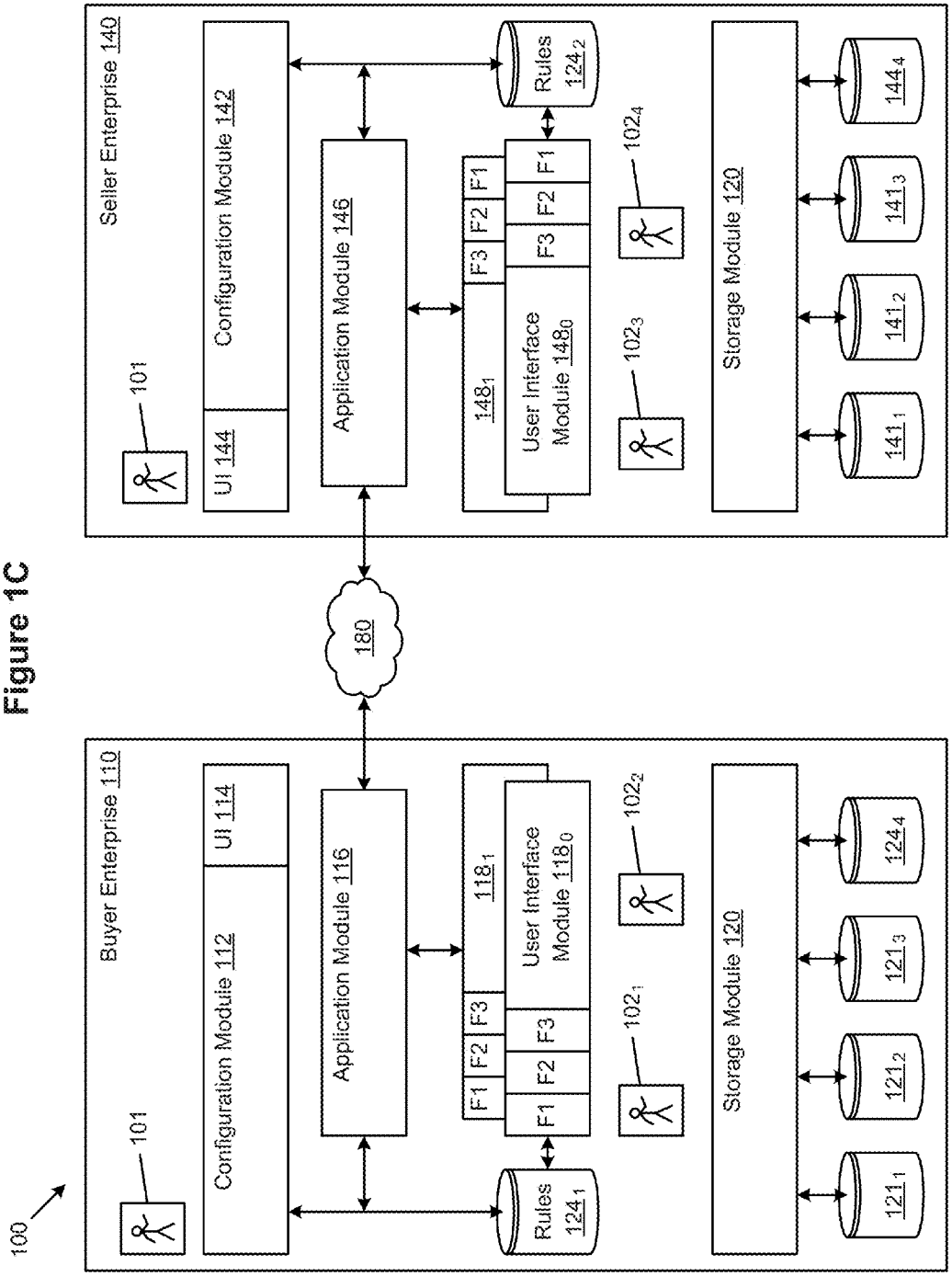
FIG. 1C illustrates an environment for implementing flexible document security for procurement agents in an electronic exchange, according to some embodiments.

FIG. 1C illustrates an environment 100 for implementing flexible document security for procurement agents in an electronic exchange, according to some embodiments. The environment includes a buyer enterprise 110 and a seller enterprise 140, each enterprise having at least one application module for conducting procurement activities (e.g., a buyer-side instance of the aforementioned application module 116, and a seller-side application module 146). An application module in one enterprise can communicate with an application module in another enterprise, and such communication can be conducted over a network 180. The network 180 can be comprised of any form of electronic communication, possibly involving a packet switching network (e.g., the Internet), and/or possibly a circuit-switched network, and/or even a dedicated communication link (e.g., a leased communication line).

The architecture of the system shown is similar as between a buyer enterprise 110 and a seller enterprise 140, however this embodiment is purely exemplary, and the similarities shown are merely illustrative of one embodiment. Moreover, the rules $124_1$ and the rules $124_2$ may be disjoint. Further, the user interface module 118 and user interface module 148 may be the same, or similar, or dissimilar. Still further, the functions (e.g., function F1, function F2, function F3, etc.) can be the same, or similar, or dissimilar.

The architecture of the system shown can include a customized user interface (e.g., UI 114, or UI 144) to meet any specific requirements of the respective enterprise. And, as earlier described with respect to the buyer enterprise, the seller enterprise may employ a super-user, which super-user might want to grant one or more forms of document access such that one procurement agent in the seller enterprise can access at least some of the documents of another procurement agent in the seller enterprise, thus the super-user can interface with a configuration module 142 for storing a document access rule.

Regardless of the similarities or dissimilarities, documents can be communicated between the enterprises over network 180. In some cases, the environment may include multiple seller enterprises, and the multiple seller enterprises can compete for business opportunities within the electronic exchange. In some practices, a given procurement document is communicated over network 180 by and between two or more participants in the electronic exchange.

Figure 2A:
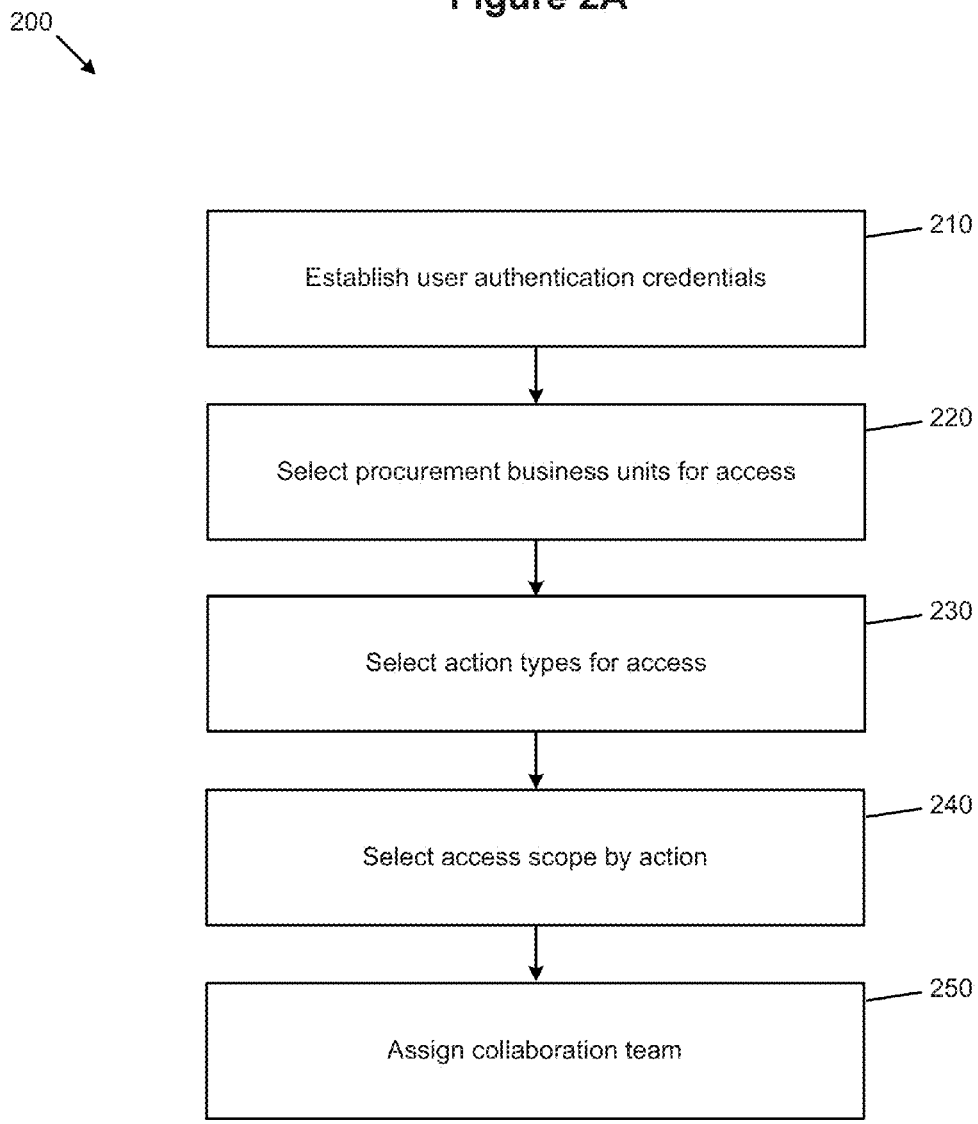
FIG. 2A illustrates a block diagram of an exemplary flow for establishing rules for implementing flexible document security for procurement agents, according to some embodiments.

FIG. 2A illustrates a block diagram of an exemplary flow 200 for establishing rules for implementing flexible document security for procurement agents. The operations shown in FIG. 2A, together with any constituent steps and decisions, can be implemented in the context of the environments and systems of FIG. 1A through FIG. 1C. Or the operations shown in FIG. 2A can be implemented in any desired environment. As shown (again referring to FIG. 1B), a user (e.g., a super-user) can use a configuration module 112, possibly including a customized user interface (e.g., UI 114) to establish user authentication credentials (see FIG. 2A, operation 210), then assign the user to one or more business units (see operation 220). The user (e.g., a super-user) can also use a configuration module 112 to select action types to be assigned to the authenticated user (see operation 230). For example, a more experienced procurement agent might be assigned to take action(s) in the case of a negotiation between parties in the electronic exchange, while a less experienced procurement agent might be assigned less critical or less complex actions. In some enterprises there exists a hierarchy or other correlation between a particular action and a list of one or more document types that would be accessed by a procurement agent in the course of carrying out the assigned actions.

The access to document types can be further refined by codification of specific types of access to the document types. For example, a more senior procurement agent might be granted 'full access' to a quotation, including the ability to change a quoted price, whereas a less senior procurement agent might be granted only a level of 'read access' to that quotation (e.g., for training purposes). More generally, the flow 200 can include the facility to select access scope by action (see operation 240).

As just mentioned, in implementing a system for flexible document security, it might be reasonable to provide document access facilities that support procurement agent training activities. For example, a more senior procurement agent (e.g., a "strategic buyer", or a procurement agent versed in volume purchase agreements) might determine a collaboration team (see operation 250) and, using a UI 114 (possibly also involving a super-user), the more senior procurement agent might also prescribe certain document access rules. In some collaborative scenarios, a plurality of procurement agents are assigned to a collaboration team, and each member of the collaboration team are given a 'full access' document access rule.

FIG. 2B illustrates a block diagram of a configuration flow 260 for storing a document access rule. In setting up a procurement system, an administrator might perform any or all of the steps shown in configuration flow 260. Some or all of the steps of configuration flow 260 might be performed before any super-user is credentialed. Or, some or all of the steps can be performed after a super-user is credentialed. As shown, the steps include an operation to define a list of roles (see operation 270), and assign default action capabilities to the defined roles (see operation 275). For example, the role to "manage requisitions" might have action capabilities to perform certain actions (e.g., approve a requisition).

Similarly, the configuration flow 260 includes an operation to assign default document access rules to a role (see operation 280). For example, the role to "manage requisitions" might have document access capabilities under certain access rights or restrictions (e.g., to read-only, to modify, and/or to re-save a user's saved requisition document) for accessing certain documents.

As indicated in the discussion of FIG. 1A, a particular procurement agent 102 might be assigned to perform actions within one business unit 108 and also to perform actions for another business unit. Such a scheme might be implemented in a fully or partially reciprocal fashion so as to provide primary/backup role assignments for a first procurement agent, and so as to provide primary/backup role assignments for a second procurement agent. Thus, the configuration flow 260 includes a step to assign a role to each of two or more procurement agents (see operation 285).

Having such a mapping (e.g., the mapping provided by operation 270, operation 275, operation 280, and operation 285), then to store a document access rule for the first of the two or more procurement agents, the document access rule to describe access to at least one document of the second of the two or more procurement agents (see operation 290) is provided. Reciprocally, to store a document access rule for the second of the two or more procurement agents, a document access rule to describe access to at least one selected document of the first of the two or more procurement agents (see operation 295) is provided.

Thus, the operations within configuration flow 260 further support the codification and storage of document access rules for implementing flexible document security for procurement agents. Some embodiments provide features (e.g., a super-user graphical user interface) for initially granting limited access to a first set of documents being initially under control of the first procurement agent (and initially inaccessible by the second procurement agent), and reciprocally, for initially granting limited access to a second set of documents being initially under control of the second procurement agent and initially inaccessible by the first procurement agent.

Figure 3:
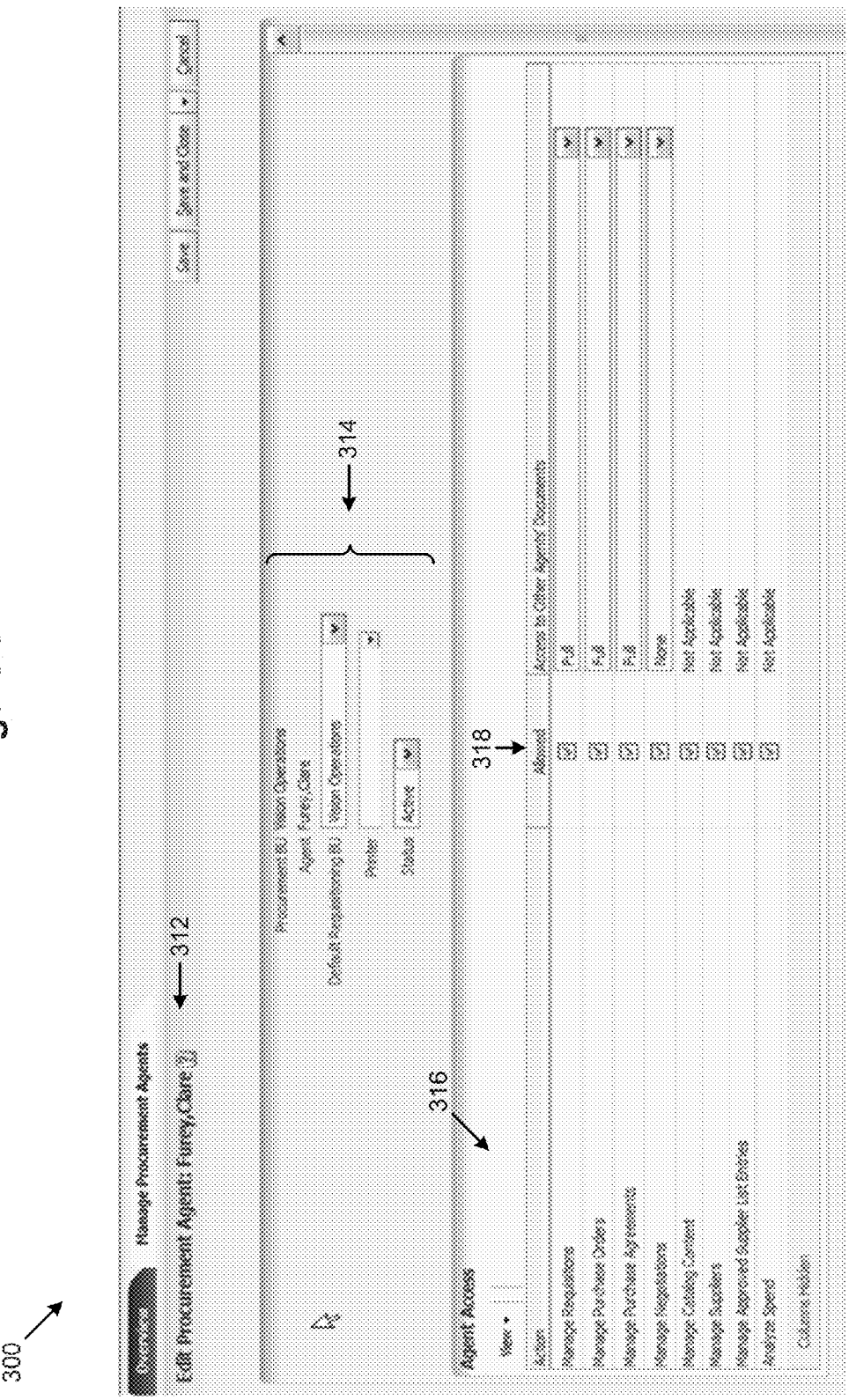
FIG. 3 illustrates an exemplary user interface for establishing procurement agent authentication credentials and allowed access, according to some embodiments.

FIG. 3 illustrates an exemplary user interface 300 for establishing procurement agent authentication credentials and allowed access. As shown, the procurement agent's name 312 is given near the top left of the screen, and various screen devices (e.g., pull-down menus, checkboxes, etc.) correspond to the named procurement agent (e.g., see identification area 314). In the agent access area 316 is shown a list of actions. Corresponding to each action (in a one-to-one correspondence) is a screen device, namely instances of an allowed check box 318. A super-user can establish the procurement agent's permissions to perform the shown action, and using the user interface 300, the super-user can do so merely by clicking the corresponding allowed check box 318 immediately to the right of the action.

Using such a screen device, procurement agent access to documents (and actions in applications) can be defined. The super-user can map appropriate access rights to the procurement agent regardless of the specific role or roles assumed by the procurement agent, which roles can include a role as (a) buyer, (b) category manager, (c) procurement manager, (d) procurement contracts administrator, (e) procurement catalog administrator, and/or (f) supplier administrator, or (g) other roles attendant to a procurement organization.

As can now be comprehended, such a screen device defines which data an agent has access to, and the degree of specificity can include which procurement business units a procurement is associated with, which document types are accessible in addition to their own documents, and which document types are accessible as pertains to other agent's documents. In some cases a particular procurement agent's access to his/her own document(s) is implicit, and is given by implicit association between a procurement agent and a business unit, possibly involving one or more partitions 107. Thus, it is possible that data security is determined via specific logic embodied in a procurement application rather than by the explicit provision of data roles. Nevertheless, it is possible to correspond actions and documents to roles and duties. Table 1 gives additional descriptions of the roles and duties.

TABLE 1

| Roles and Duties | |
| --- | --- |
| Role | Duties |
| Buyer | Transactional aspects of the procurement processes. |
| Category Manager | Identifying savings opportunities, determining negotiation strategies, creating requests for quotes, requests for information, requests for a proposal, or auction events on behalf of their organization, and awarding future business typically in the form of contracts or purchase orders to suppliers. |
| Procurement Manager | Managing a group of buyers in an organization. |
| Procurement Contracts Administrator | Creating, managing and administering procurement contracts. |
| Procurement Catalog Administrator | Managing agreements and catalog content including catalogs, category hierarchy, content zones, information templates, map sets, public shopping lists, and smart forms. |

TABLE 1-continued

| Roles and Duties | |
| --- | --- |
| Role | Duties |
| Supplier Administrator | Managing supplier profile and user provisioning. |

Figure 4:
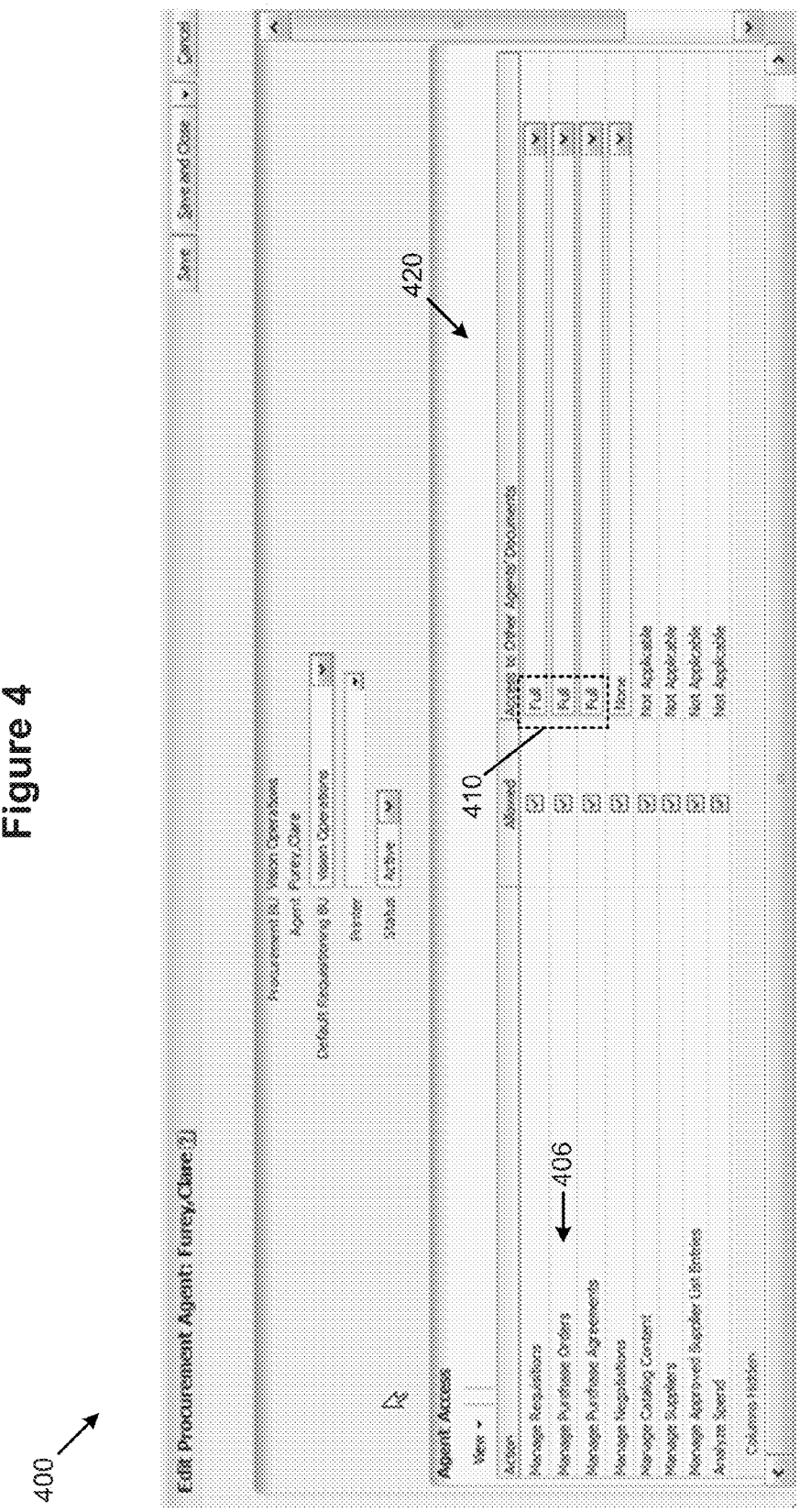
FIG. 4 illustrates an exemplary user interface for controlling access to another procurement agent's documents, according to some embodiments.

FIG. 4 illustrates an exemplary user interface 400 for controlling access to another procurement agent's documents. In the example shown, access to the other agents' documents area 420 comprises several pull-down menus—one pull-down for each action that supports access to another agent's documents. For example, access to the other agents' documents area 420 comprises a pull-down corresponding to the manage purchase orders action 406. The pull-down menu can list "None", "View Access", "Modify Access", and/or (as shown in area 410) "Full". It is sometimes the case that access by one agent to another agent's documents is not applicable, and in such a case, the pull-down menu might be pre-assigned (e.g., to "Not Applicable"), or grayed-out, or the pull-down menu might simply be absent.

Figure 5:
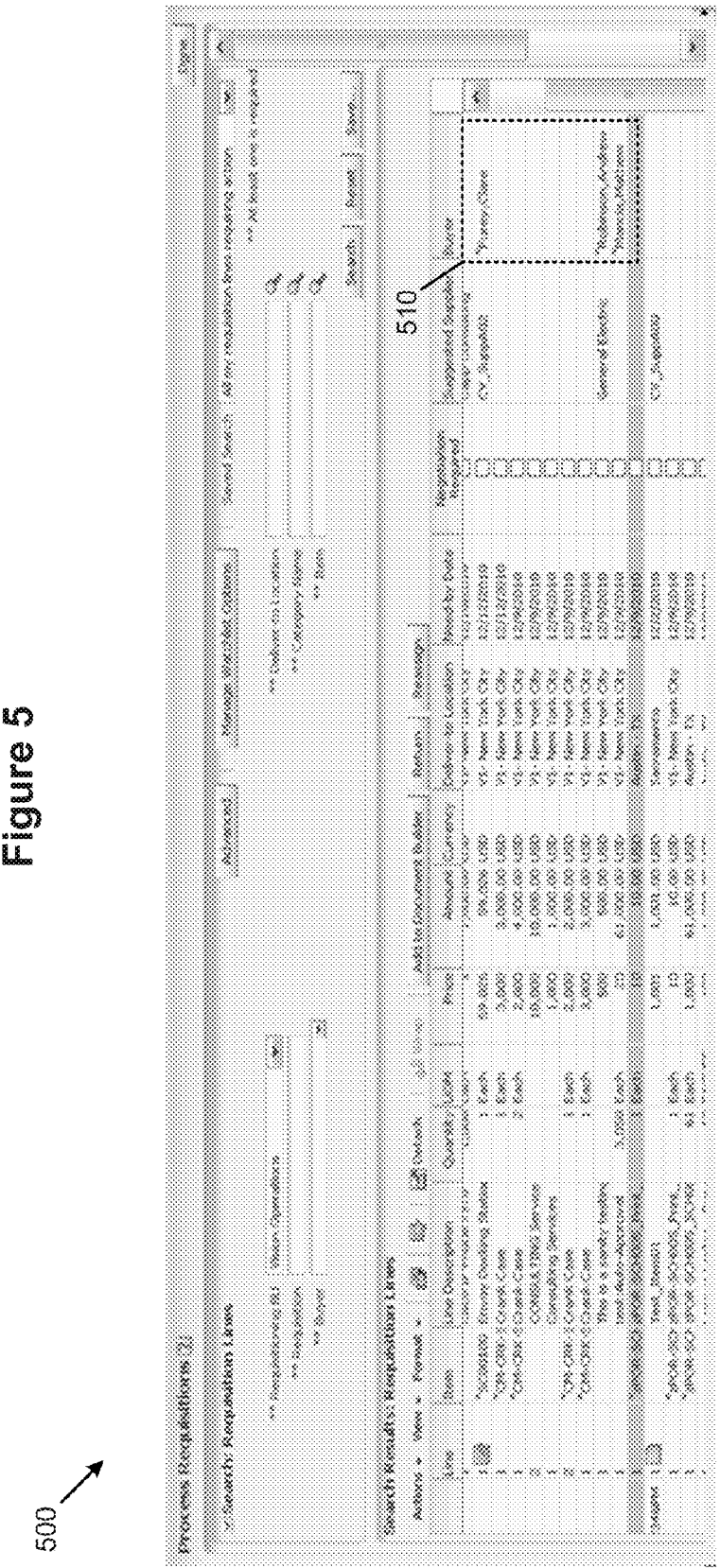
FIG. 5 illustrates an exemplary management interface for controlling procurement agent permissions to access negotiations, according to some embodiments.

FIG. 5 illustrates an exemplary management interface 500 for controlling procurement agent permissions to access negotiations. As shown, the process requisitions screen device includes a buyer area 510, in which buyer area is shown the name of the assigned procurement agent that is assigned to a particular requisition line.

The aforementioned access types (e.g., access of type "None", access of type "View Access", access of type "Modify Access", and/or access of type "Full") is context dependent, and the specific access permitted (or denied) can be enforced by the procurement application. For example, in the context of managing requisitions, the meaning of an assigned document access rule is given in Table 2.

TABLE 2

| Access to Other Agent's Documents | |
| --- | --- |
| Document Access Rule | Enforcement by Procurement Application |
| None | Cannot access other agent's requisitions. |
| View | Can view other agent's requisitions in the view requisition lines page (including unassigned). |
| Full | Can view other agent's requisitions in the view requisition lines page and process other agent's requisitions in the process requisitions page (including unassigned). |

Figure 6:
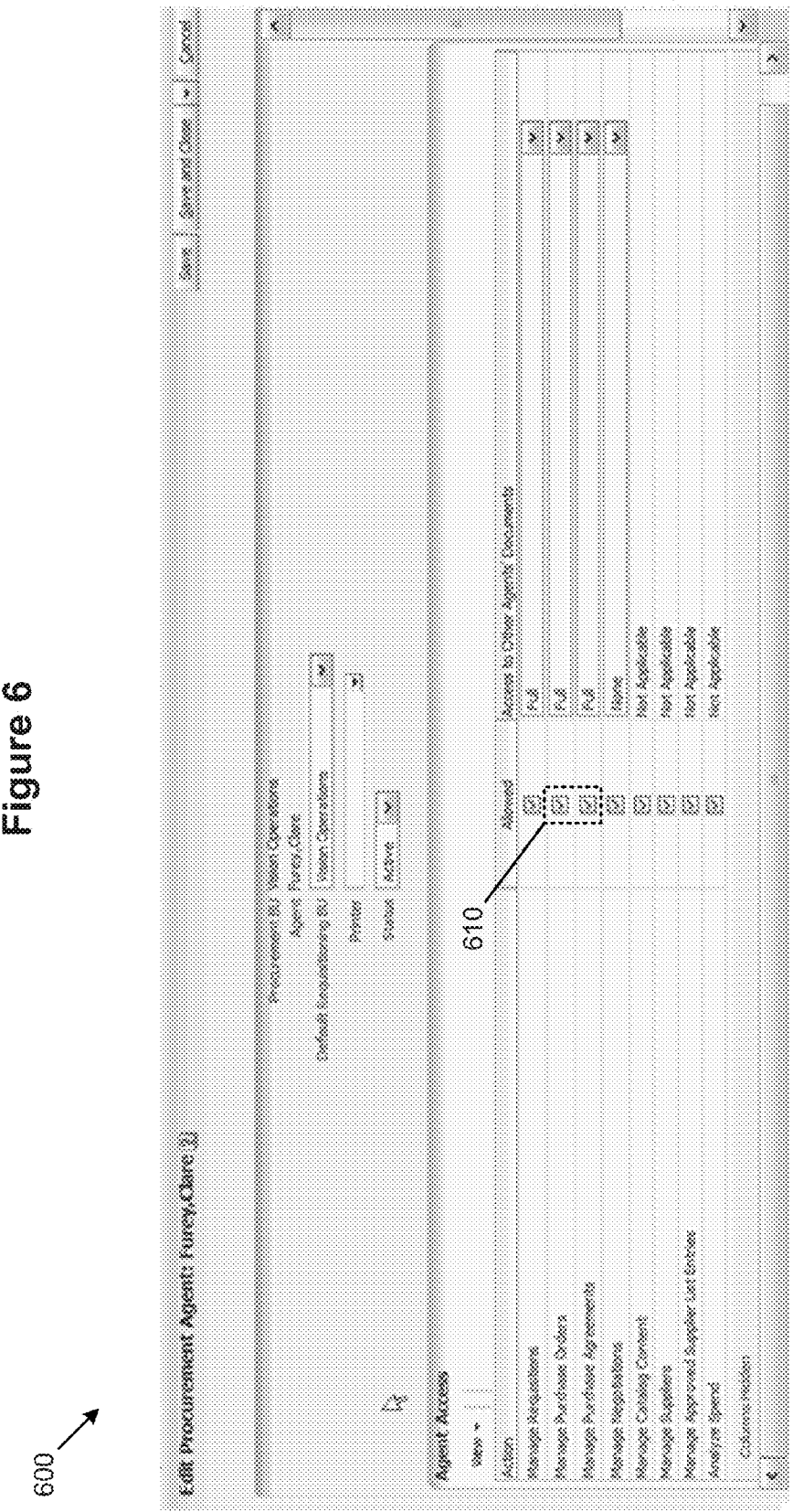
FIG. 6 illustrates an exemplary user interface for controlling procurement agent access to purchase order data and agreement data, according to some embodiments.

FIG. 6 illustrates an exemplary user interface 600 for controlling procurement agent access to purchase order data and agreement data. In this embodiment, the default rules for controlling procurement agent access can be established based on the assigned role of the procurement agent. For example, and as shown, the various screen devices (e.g., pull-down menus, checkboxes, etc.) that correspond to the named procurement agent are pre-defined to reflect a default access to purchase order data and agreement data (see area 610). The appearance of the check marks in the check boxes indicates the aforementioned default access, reflecting that the procurement agent has an association with the requisitioning business unit (e.g., "Vision Operations") and that the procurement agent has an association with the duties of the role 104 or roles 104 that encompass actions to "Manage Purchase Orders", and to "Manage Purchase Agreements". Such associations can be codified in a procurement agent definition record. As earlier discussed, a procurement application can be configured to provide access, and/or deny access, and/or establish access rules pertaining to actions and documents used for communication, and the user interface 600 of FIG. 6 is an example of one technique that a procurement application can employ to conveniently provide default access.

Figure 7:
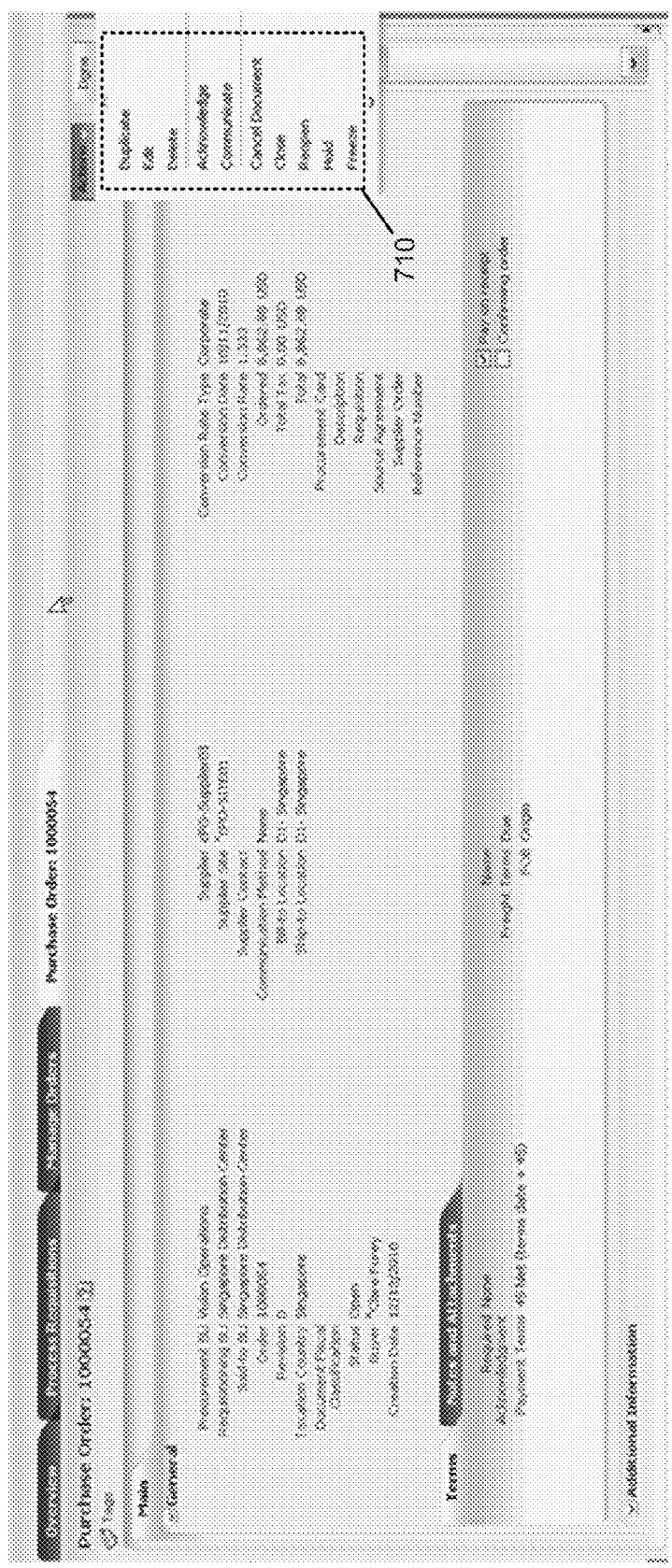
FIG. 7 illustrates an exemplary user interface for taking actions on purchase orders and agreements, according to some embodiments.

FIG. 7 illustrates an exemplary user interface 700 for taking actions on purchase orders and agreements. As shown, the management interface screen device includes a purchase order action area 710, in which purchase order action area is shown the name of a particular action that has been authorized for the procurement agent working on the shown purchase order.

The aforementioned access types (e.g., access of type "None", access of type "View Access", access of type "Modify Access", and/or access of type "Full") is context dependent, and the specific access permitted (or denied) can be enforced by the procurement application. For example, in the context of managing purchase orders and agreements, the meaning of an assigned document access rule is given in Table 3.

TABLE 3

Access to Other Agent's Purchase Orders and Agreements

| Access Rule | Enforcement by Procurement Application |
|---|---|
| None | Cannot access other agent's purchase orders and agreements. |
| View | Can view other agent's purchase orders and agreements (including purchase orders and agreements that are unassigned to a procurement agent). |
| Modify | Can view, edit, delete, and withdraw other agent's purchase orders and agreements (including purchase orders and agreements that are unassigned to a procurement agent). |
| Full | Can view, edit, delete, withdraw, freeze, hold, close, cancel, and final close other agent's documents (including purchase orders and agreements that are unassigned to a procurement agent). |

Figure 8:
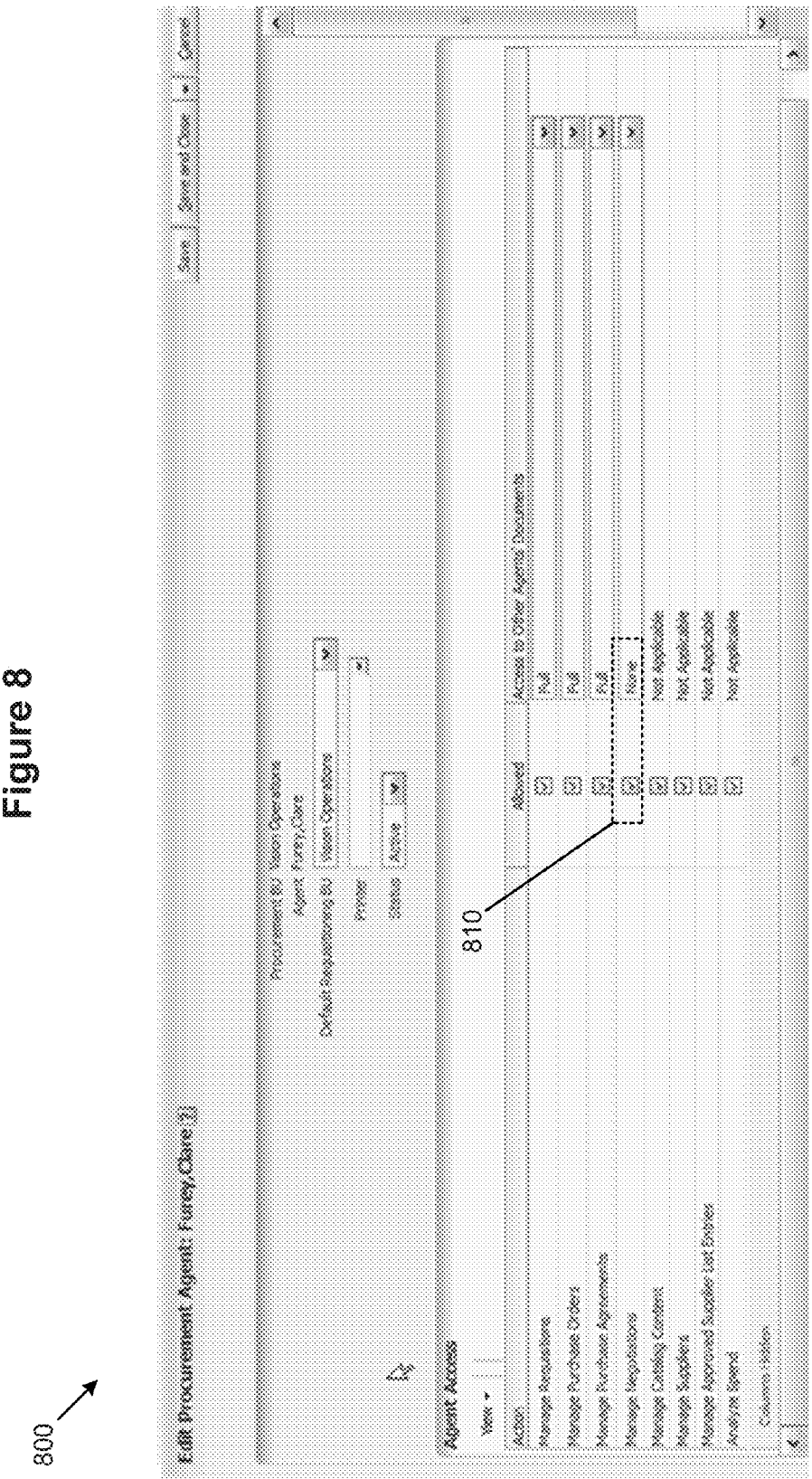
FIG. 8 illustrates an exemplary user interface for controlling procurement agent access to documents for managing negotiations, according to some embodiments.

FIG. 8 illustrates an exemplary user interface 800 for controlling procurement agent access to documents for managing negotiations. In this embodiment, the default rules for controlling procurement agent access can be established based on the assigned role of the procurement agent. For example, and as shown, the various screen devices (e.g., pull-down menus, checkboxes, etc.) that correspond to the named procurement agent are pre-defined to reflect a default access to documents for managing negotiations (see area 810). The appearance of the check mark in the check box indicates the aforementioned default access, and reflects that the procurement agent has an association with the requisitioning business unit (e.g., "Vision Operations"), and that the procurement agent has an association with the duties of the role 104 or roles 104 that encompass actions to "Manage Negotiations". Such associations can be codified in a procurement agent definition record. As earlier discussed, a procurement application can be configured to provide access, and/or deny access, and/or establish access rules pertaining to actions and documents used for communication, including actions and documents related to the role of managing negotiations, and the user interface 800 of FIG. 8 is an example of one technique that a procurement application can employ to conveniently provide default access.

Figure 9:
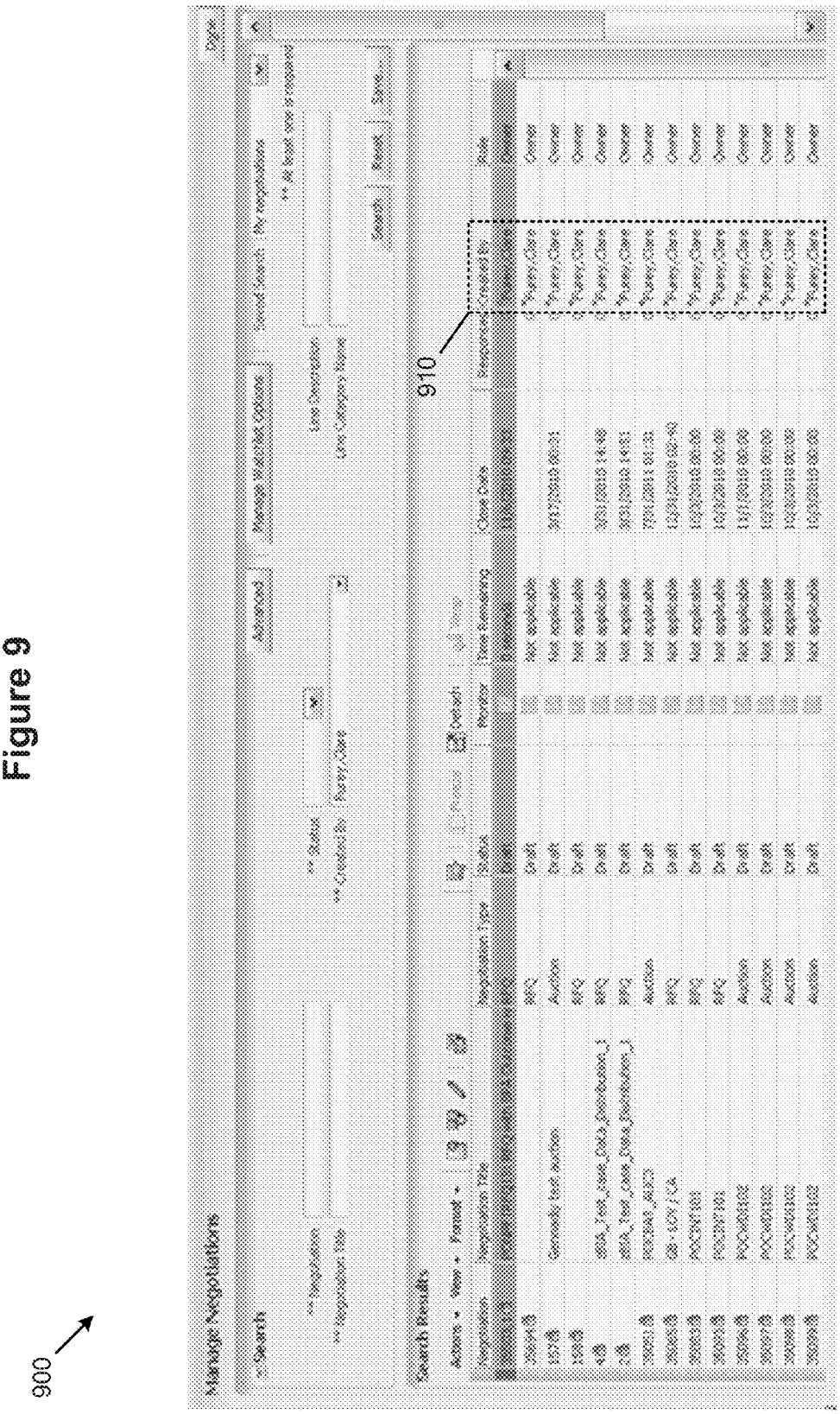
FIG. 9 illustrates an exemplary user interface for controlling procurement agent permissions to access negotiations, according to some embodiments.

FIG. 9 illustrates an exemplary user interface 900 for controlling procurement agent permissions to access negotiations. As shown, the manage negotiations screen device includes a negotiation item owner area 910, in which negotiation item owner area is shown the name of a particular procurement agent that has been authorized to take action on the particular negotiation item.

The aforementioned access types (e.g., access of type "None", access of type "View Access", access of type "Modify Access", and/or access of type "Full") is context dependent, and the specific access permitted (or denied) can be enforced by the procurement application. For example, in the context of managing negotiations, the meaning of an assigned document access rule is given in Table 4.

TABLE 4

Access to Other Agent's Negotiations

| Access Rule | Enforcement by Procurement Application |
|---|---|
| None | Cannot access other agents' negotiation documents. |
| View | Can view other agents' negotiation documents. |
| Full | Can perform all actions on other agents' negotiation documents. |

In some collaborative scenarios, a plurality of procurement agents are assigned to a collaboration team, and each member of the collaboration team are given a 'full access' document access rule to access each other's negotiation documents. In other collaborative scenarios, a plurality of procurement agents are assigned to a collaboration team, and each member of the collaboration team is given access via collaboration rule definitions, which collaboration rule definitions override the rules 124 (if any) that are specific to the procurement agents in the collaboration team.

Figure 10:
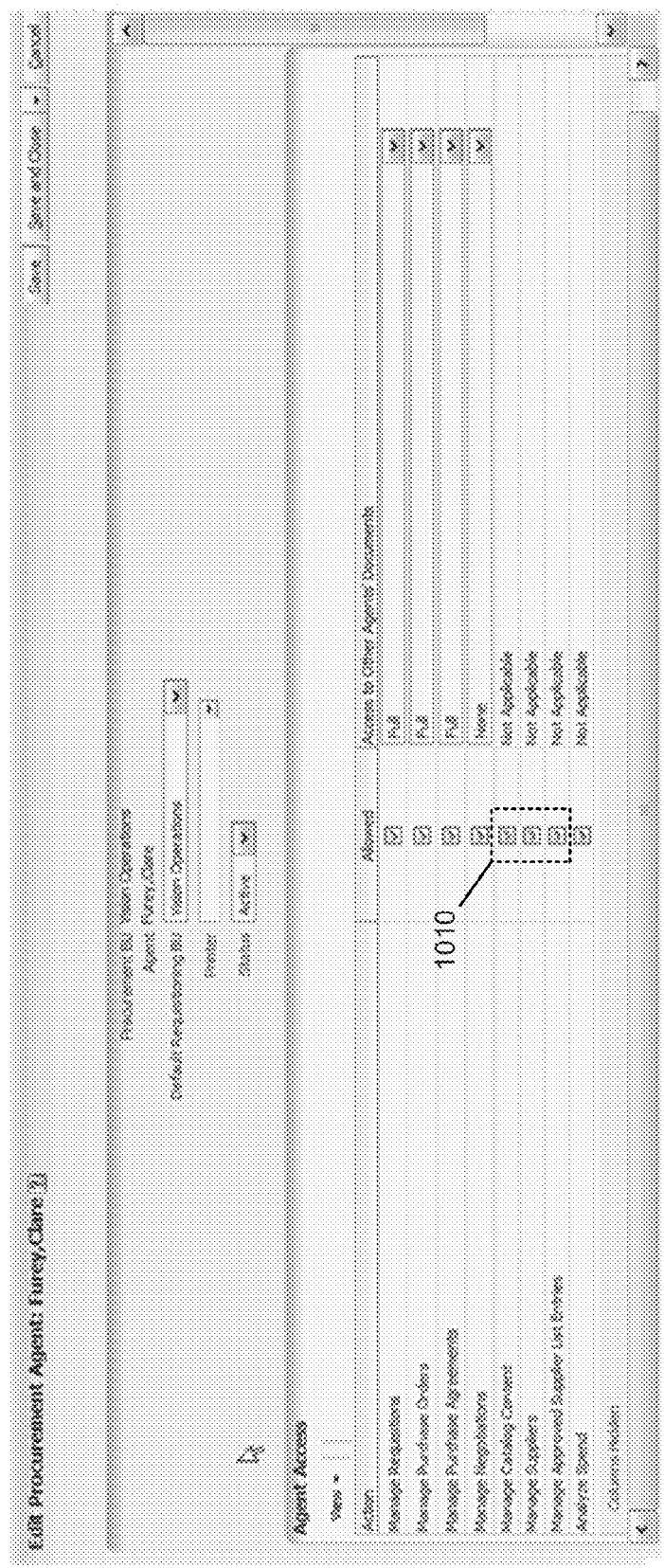
FIG. 10 illustrates an exemplary user interface for controlling procurement agent access to catalogs, supplier sites and approved supplier lists, according to some embodiments.

FIG. 10 illustrates an exemplary user interface 1000 for controlling procurement agent access to catalogs, supplier sites, and approved supplier lists. In this embodiment, the default rules for controlling procurement agent access to catalogs, supplier sites, and approved supplier lists can be established based on the assigned role of the procurement agent. For example, and as shown, the various screen devices (e.g., pull-down menus, checkboxes, etc.) that correspond to the named procurement agent are pre-defined to reflect a default access to documents for managing catalogs, supplier sites and approved supplier lists (see area 1010). The appearance of check marks in the check boxes indicates the default access, and reflects that the procurement agent has an association with the depicted business unit (e.g., "Vision Operations"), and that the procurement agent has an association with the duties of the role 104 or roles 104 that encompass actions to "Manage Catalog Content", "Manage Suppliers", and "Manage Approved Supplier List Entries". Such associations can be codified in a procurement agent definition record. As earlier discussed, a procurement application can be configured to provide access, and/or deny access, and/or establish access rules pertaining to actions and documents used for communication, including actions and documents related to the role or roles to "Manage Catalog Content", "Manage Suppliers", and "Manage Approved Supplier List Entries", and the user interface 1000 of FIG. 10 is an example of one technique that a procurement application can employ to conveniently provide default access.

The aforementioned access types (e.g., access of type "None", access of type "View Access", access of type "Modify Access", and/or access of type "Full") is context dependent, and the specific access permitted (or denied) can be enforced by the procurement application. For example, in the context of managing catalogs, supplier sites, and approved supplier lists, the meaning of an assigned document access rule is given in Table 5

TABLE 5

Access Enforcement by Procurement Application

| Access Rule | Enforcement by Procurement Application |
|---|---|
| None | Cannot access catalogs, supplier sites, and approved supplier lists pertaining to a different business unit. |
| View | Can view access catalogs, supplier sites, and approved supplier lists pertaining to a different business unit. |
| Full | Can perform all actions pertaining to access of catalogs, supplier sites, and approved supplier lists pertaining to any business unit. |

Figure 11:
FIG. 11 illustrates an exemplary user interface for controlling procurement agent access to business intelligence documents, according to some embodiments.

FIG. 11 illustrates an exemplary user interface 1100 for controlling procurement agent access to business intelligence documents. In this embodiment, the default rules for controlling procurement agent access to business intelligence documents can be established based on the assigned role of the procurement agent. For example, and as shown, the various screen devices (e.g., pull-down menus, checkboxes, etc.) that correspond to the named procurement agent are pre-defined to reflect a default access to documents for business intelligence documents (see area 1110). The appearance of a check mark in the check box within area 1110 indicates the default access, and reflects that the procurement agent has an association with the depicted business unit (e.g., "Vision Operations"), and that the procurement agent has an association with the duties of the role 104 or roles 104 that encompass actions to "Analyze Spend". Such associations can be codified in a procurement agent definition record. As earlier discussed, a procurement application can be configured to provide access, and/or deny access, and/or establish access rules pertaining to actions and documents used for access to business intelligence documents, including actions and documents related to the role or roles to "Analyze Spend". In some cases, the business intelligence documents (e.g., "spend documents", "invoice data", etc.) can be identified using an invoice supplier site belonging to the procurement business unit. The user interface 1100 of FIG. 11 is an example of one technique that a procurement application can employ to conveniently provide default access.

Figure 12:
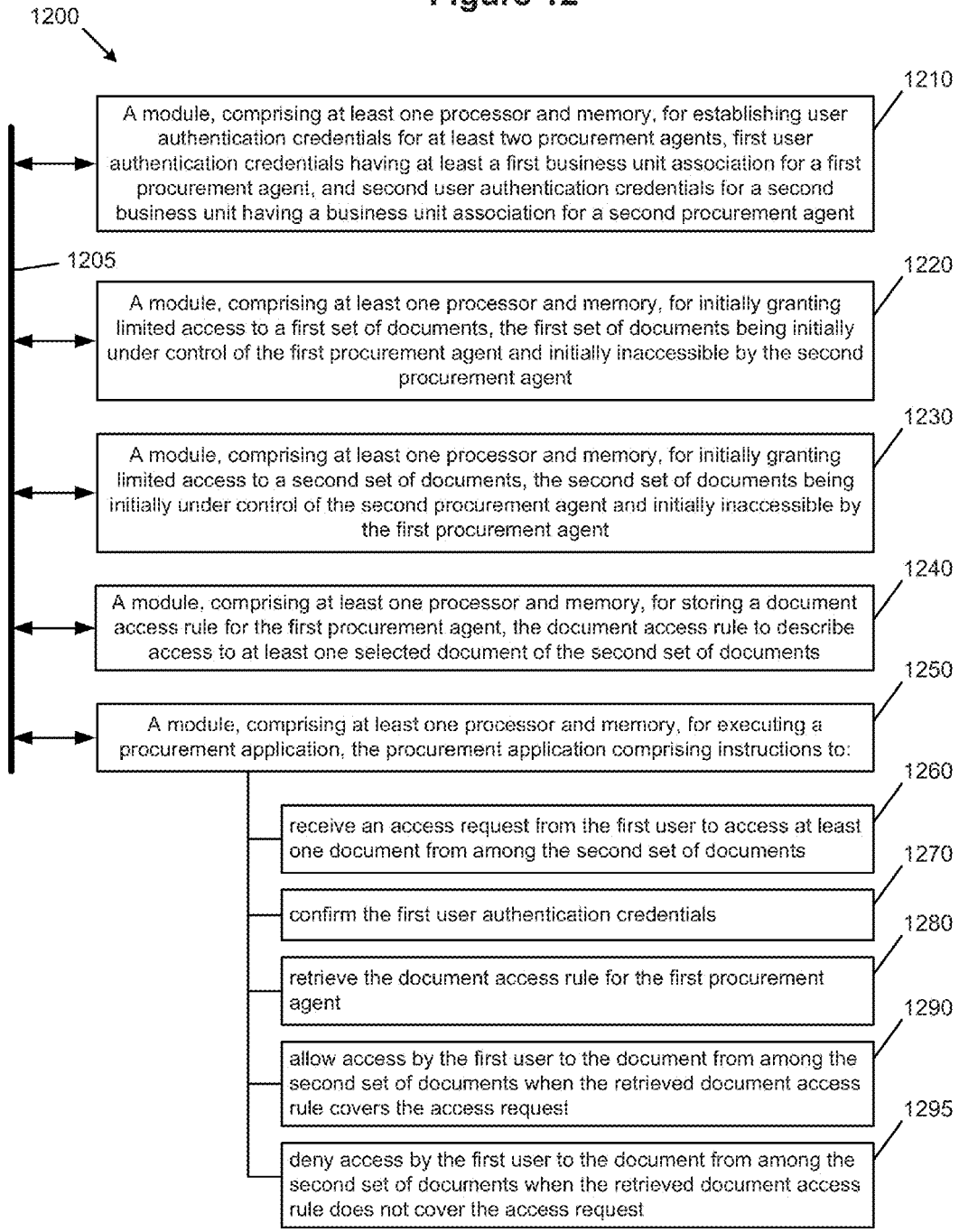
FIG. 12 illustrates a block diagram of a system for implementing document security for procurement agents, according to some embodiments.

FIG. 12 illustrates a block diagram of a system for implementing document security for procurement agents. As an option, the present system 1200 may be implemented in the context of the architecture and functionality of the embodiments described herein. Of course, however, the system 1200 or any operation therein may be carried out in any desired environment. As shown, system 1200 comprises a plurality of modules, a module comprising at least one processor and a memory, each connected to a communication link 1205, and any module can communicate with other modules over communication link 1205. The modules of the system can be implemented using one processor, or more than one processor, and the modules can individually or in combination, perform method steps within system 1200. Any method steps performed within system 1200 may be performed in any order unless as may be specified in the claims. As shown, system 1200 implements a method for implementing document security for procurement agents, the system 1200 comprising modules for: establishing user authentication credentials for at least two procurement agents, first user authentication credentials having at least a first business unit association for a first procurement agent, and second user authentication credentials for a second business unit having a business unit association for a second procurement agent (see module 1210); initially granting limited access to a first set of documents, the first set of documents being initially under control of the first procurement agent and initially inaccessible by the second procurement agent (see module 1220); initially granting limited access to a second set of documents, the second set of documents being initially under control of the second procurement agent and initially inaccessible by the first procurement agent (see module 1230); storing a document access rule for the first procurement agent, the document access rule to describe access to at least one selected document of the second set of documents (see module 1240); executing a procurement application (see module 1250) the procurement application comprising instructions to; receive an access request from the first user to access at least one document from among the second set of documents (see module 1260), confirm the first user authentication credentials (see module 1270), retrieve the document access rule for the first procurement agent (see module 1280), allow access by the first user to the document from among the second set of documents when the retrieved document access rule covers the access request (see module 1290), and deny access by the first user to the document from among the second set of documents when the retrieved document access rule does not cover the access request (see module 1295).

System Architecture Overview

Figure 13:
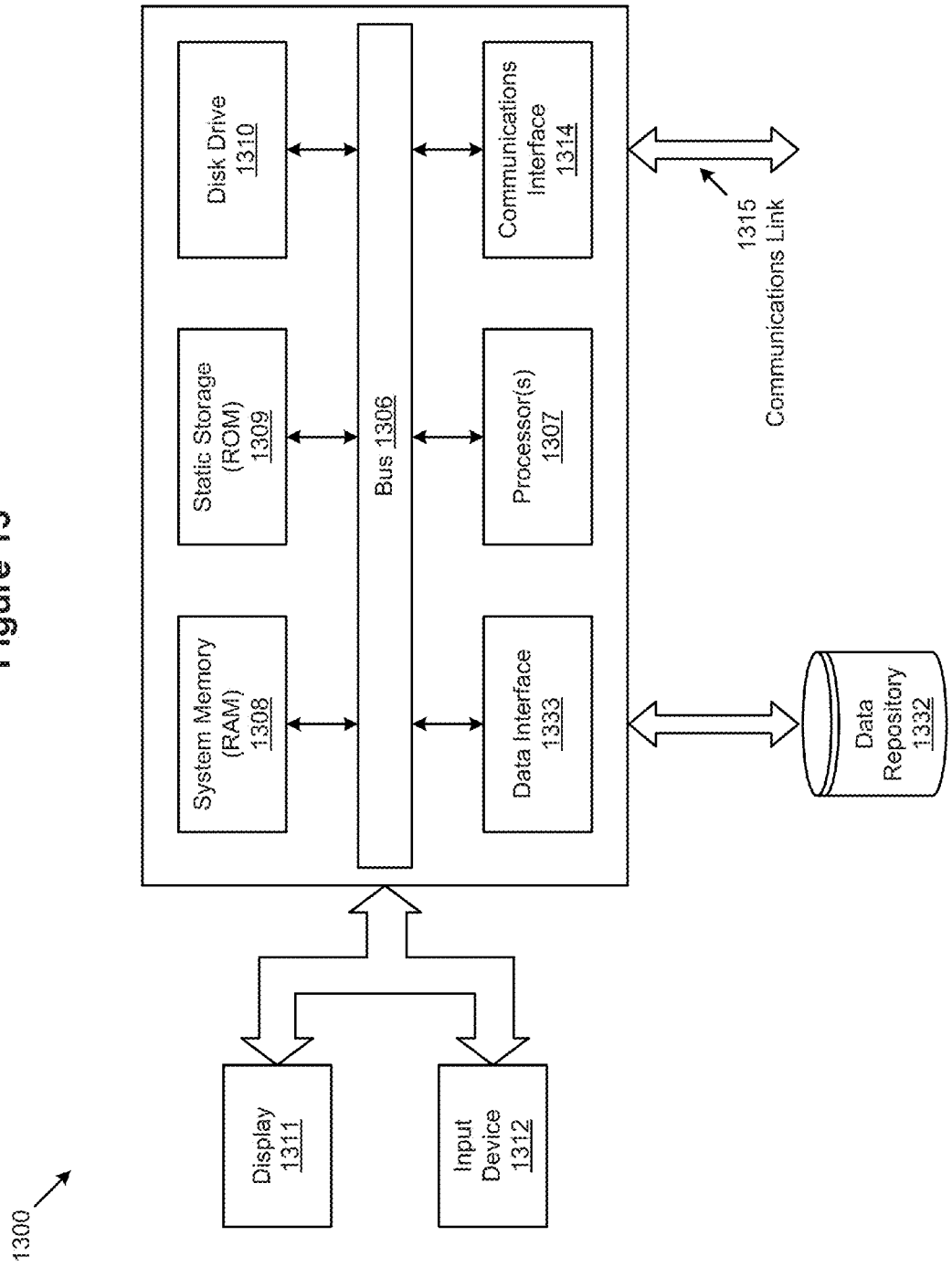
FIG. 13 illustrates a computer system on which an embodiment of the claims can be implemented.

FIG. 13 depicts a block diagram of an instance of a computer system 1300 suitable for implementing an embodiment of the present disclosure. Computer system 1300 includes a bus 1306 or other communication mechanism for communicating information, which interconnects subsystems and devices, such as a processor 1307, a system memory 1308 (e.g., RAM), a static storage device 1309 (e.g., ROM), a disk drive 1310 (e.g., magnetic or optical), a data interface 1333, a communications interface 1314 (e.g., modem or Ethernet card), a display 1311 (e.g., CRT or LCD), input devices 1312 (e.g., keyboard, cursor control), and an external data repository 1332.

According to one embodiment of the disclosure, computer system 1300 performs specific operations by processor 1307 executing one or more sequences of one or more instructions contained in system memory 1308. Such instructions may be read into system memory 1308 from another computer readable/usable medium, such as a static storage device 1309 or a disk drive 1310. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1307 for execution. Such a medium may take many forms, including but not limited to, non-volatile media and volatile media. Non-volatile media includes, for example, optical or magnetic disks, such as disk drive 1310. Volatile media includes dynamic memory, such as system memory 1308.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of computer system 1300. According to other embodiments of the disclosure, two or more instances of computer systems 1300 coupled by a communication link 1315 (e.g., LAN, PTSN, or wireless network) may perform the sequence of instructions required to practice the disclosure in coordination with one another.

Computer system 1300 may transmit and receive messages, data, and instructions, including program, i.e., application code, through communication link 1315 and communications interface 1314. Received program code may be executed by processor 1307 as it is received, and/or stored in disk drive 1310 or other non-volatile storage for later execution.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A computer implemented method for implementing document security for procurement agents, the method comprising:
    establishing user authentication credentials for at least two procurement agents, first user authentication credentials having at least a first business unit association for a first procurement agent, and second user authentication credentials for a second business unit having a business unit association for a second procurement agent;
    initially granting limited access to a first set of documents, the first set of documents being initially under control of the first procurement agent and initially inaccessible by the second procurement agent;
    initially granting limited access to a second set of documents, the second set of documents being initially under control of the second procurement agent and initially inaccessible by the first procurement agent;
    storing a document access rule for the first procurement agent, the document access rule to describe access to at least one selected document of the second set of documents, wherein the document access rule describes what actions the first procurement agent is allowed to perform on the least one selected document;
    executing a procurement application, the procurement application comprising instructions to:
        receive an access request from a first user to access at least one document from among the second set of documents;
        confirm the first user authentication credentials;
        retrieve the document access rule for the first procurement agent;
        allow access by the first user to the document from among the second set of documents in accordance with the document access rule when the retrieved document access rule covers the access request; and
        deny access by the first user to the document from among the second set of documents when the retrieved document access rule does not cover the access request.

2. The method of claim 1, further comprising:
    assigning one or more first permitted actions to the first procurement agent, and
    assigning one or more second permitted actions to the second procurement agent.

3. The method of claim 1, wherein initially granting limited access is based on an assigned role.

4. The method of claim 1, wherein the document access rule is one of, full access, modify access, read access, or no access.

5. The method of claim 1, wherein first set of documents comprises at least one of, a requisition document, an order document, a procurement agreement document, a negotiation document, an approved supplier list document, a catalog document, a management information document.

6. The method of claim 1, wherein at least one of the user authentication credentials comprises a rule to selectively allow access to the first procurement agent.

7. The method of claim 1, wherein at least one of the user authentication credentials comprises a rule to selectively deny access to the first procurement agent.

8. A computer system for implementing document security for procurement agents, the computer system comprising:
    a computer processor; and
    a memory to hold program instructions, the program instructions to perform,
        establishing user authentication credentials for at least two procurement agents, first user authentication credentials having at least a first business unit association for a first procurement agent, and second user authentication credentials for a second business unit having a business unit association for a second procurement agent;
        initially granting limited access to a first set of documents, the first set of documents being initially under control of the first procurement agent and initially inaccessible by the second procurement agent;
        initially granting limited access to a second set of documents, the second set of documents being initially under control of the second procurement agent and initially inaccessible by the first procurement agent;
        storing a document access rule for the first procurement agent, the document access rule to describe access to at least one selected document of the second set of documents, wherein the document access rule describes what actions the first procurement agent is allowed to perform on the least one selected document; and
        executing a procurement application, the procurement application comprising instructions to:
            receive an access request from a first user to access at least one document from among the second set of documents;
            confirm the first user authentication credentials;
            retrieve the document access rule for the first procurement agent;
            allow access by the first user to the document from among the second set of documents in accordance with the document access rule when the retrieved document access rule covers the access request; and deny access by the first user to the document from among the second set of documents when the retrieved document access rule does not cover the access request.

9. The computer system of claim 8, further comprising:

assigning one or more first permitted actions to the first procurement agent, and assigning one or more second permitted actions to the second procurement agent.

10. The computer system of claim 8, wherein initially granting limited access is based on an assigned role.

11. The computer system of claim 8, wherein the document access rule is one of, full access, modify access, read access, or no access.

12. The computer system of claim 8, wherein first set of documents comprises at least one of, a requisition document, an order document, a procurement agreement document, a negotiation document, an approved supplier list document, a catalog document, a management information document.

13. The computer system of claim 8, wherein at least one of the user authentication credentials comprises a rule to selectively allow access to the first procurement agent.

14. The computer system of claim 8, wherein at least one of the user authentication credentials comprises a rule to selectively deny access to the first procurement agent.

15. A computer program product embodied in a non-transitory computer readable medium, the computer readable medium having stored thereon a sequence of instructions which, when executed by a processor causes the processor to execute a method to implement document security for procurement agents, the method comprising:

establishing user authentication credentials for at least two procurement agents, first user authentication credentials having at least a first business unit association for a first procurement agent, and second user authentication credentials for a second business unit having a business unit association for a second procurement agent;

initially granting limited access to a first set of documents, the first set of documents being initially under control of the first procurement agent and initially inaccessible by the second procurement agent;

initially granting limited access to a second set of documents, the second set of documents being initially under control of the second procurement agent and initially inaccessible by the first procurement agent;

storing a document access rule for the first procurement agent, the document access rule to describe access to at least one selected document of the second set of documents, wherein the document access rule describes what actions the first procurement agent is allowed to perform on the least one selected document;

executing a procurement application, the procurement application comprising instructions to:

receive an access request from a first user to access at least one document from among the second set of documents;

confirm the first user authentication credentials;

retrieve the document access rule for the first procurement agent;

allow access by the first user to the document from among the second set of documents in accordance with the document access rule when the retrieved document access rule covers the access request; and deny access by the first user to the document from among the second set of documents when the retrieved document access rule does not cover the access request.

16. The computer program product of claim 15, further comprising:

assigning one or more first permitted actions to the first procurement agent, and assigning one or more second permitted actions to the second procurement agent.

17. The computer program product of claim 15, wherein initially granting limited access is based on an assigned role.

18. The computer program product of claim 15, wherein the document access rule is one of, full access, modify access, read access, or no access.

19. The computer program product of claim 15, wherein first set of documents comprises at least one of, a requisition document, an order document, a procurement agreement document, a negotiation document, an approved supplier list document, a catalog document, a management information document.

20. The computer program product of claim 15, wherein at least one of the user authentication credentials comprises a rule to selectively allow access to the first procurement agent.

* * * * *

UNITED STATES PATENT AND TRADEMARK OFFICE
CERTIFICATE OF CORRECTION

PATENT NO. : 8,661,503 B2
APPLICATION NO. : 13/251066
DATED : February 25, 2014
INVENTOR(S) : Powell et al.

It is certified that error appears in the above-identified patent and that said Letters Patent is hereby corrected as shown below:

In the Specification

In column 15, line 3, delete "Table 5" and insert -- Table 5. --, therefor.

Signed and Sealed this
First Day of July, 2014

Michelle K. Lee
*Deputy Director of the United States Patent and Trademark Office*